(12) United States Patent
Anderson et al.

(10) Patent No.: US 7,933,998 B2
(45) Date of Patent: Apr. 26, 2011

(54) DYNAMIC CAN BUS SYSTEM CONFIGURATION AND MESSAGING

(75) Inventors: Thomas Michael Anderson, Lewisville, TX (US); Russel Ray Rustad, Keller, TX (US); Lee Michael Estep, North Richland Hills, TX (US); In Sik Park, Haltom City, TX (US); Jorge Francisco Gonzalez, Forth Worth, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 3212 days.

(21) Appl. No.: 10/044,555

(22) Filed: Jan. 11, 2002

(65) Prior Publication Data
US 2003/0135622 A1 Jul. 17, 2003

(51) Int. Cl.
*G06F 15/16* (2006.01)
(52) U.S. Cl. ........ 709/227; 709/224; 709/229; 709/238; 709/244
(58) Field of Classification Search .................. 709/224, 709/227, 229, 238, 244, 223
See application file for complete search history.

(56) References Cited

U.S. PATENT DOCUMENTS

| | | | | |
|---|---|---|---|---|
| 5,742,833 A | * | 4/1998 | Dea et al. ...................... | 713/323 |
| 6,192,483 B1 | * | 2/2001 | Moiin et al. .................... | 714/4 |
| 6,701,449 B1 | * | 3/2004 | Davis et al. .................... | 714/4 |
| 6,839,344 B1 | * | 1/2005 | Couillaud et al. ............. | 370/353 |
| 2002/0097720 A1 | * | 7/2002 | Goodman et al. ............ | 370/392 |
| 2005/0182838 A1 | * | 8/2005 | Sheets et al. .................. | 709/226 |

FOREIGN PATENT DOCUMENTS

| | | |
|---|---|---|
| WO | WO 00/76123 | 6/2000 |
| WO | WO 01/45348 | 12/2000 |

* cited by examiner

*Primary Examiner* — Mohamed Wasel

(57) ABSTRACT

A method and system for communicating over a controller area network (CAN) bus (14-22) enables messages to be routed from a controlling software component (46-50) to one or more processor-enabled peripheral devices (24-44) on a discrete basis over the CAN bus (14-22) to control the plurality of processor-enabled peripheral devices (24-44). By overlaying a hardware device protocol on a CAN bus protocol to realize CAN bus messaging, the controlling software components (46-50) can discretely communicate with the external processor-controlled peripheral devices (24-44) using the multiple multi-drop CAN busses (14-22). In addition, a method and system for handling registration of a processor-enabled peripheral device (24-44) with a controlling software component (46-50) includes creating a logical connection between the processor-enabled peripheral device (24-44) and the controlling software component (46-50) and breaking the logical connection between the processor-enabled peripheral device (24-44) and the controlling software component (46-50) if the processor-enabled peripheral device (24-44) is removed and re-introduced or if the controlling software component (46-50) is reset for re-registration purposes to provide plug-and-play capabilities and dynamic registration of processor-enabled peripheral devices (24-44).

17 Claims, 7 Drawing Sheets

| WORD NUMBER (16 BITS) | DESCRIPTION | VALUE |
|---|---|---|
| 1 | FUNCTIONAL AREA ID | UNIQUE IDENTIFIER OF COMPONENT |
| 2 | MESSAGE TYPE | REGISTRATION (0x7) |
| 3 | UPPER WORD OF TRANSACTION ID | 0 |
| 4 | LOWER WORD OF TRANSACTION ID | 0 |
| 5 | UPPER WORD OF MESSAGE LENGTH | 0 |
| 6 | LOWER WORD OF MESSAGE LENGTH | |
| 7 | CAN HEADER | DESCRIBED BELOW |
| 8-10 | DATA | DESCRIBED BELOW |

SOFTWARE COMPONENT REGISTRATION MESSAGE (HEADER)    *FIG. 2A*

| BYTE NUMBER (8 BITS) | DESCRIPTION | VALUE |
|---|---|---|
| 1 | DEVICE ID MESSAGE OPCODE | BITS 7,6=0<br>BITS 5-0=0x7 |
| 2 | DEVICE TYPE, DEVICE NUMBER | BITS 7-4=0xF (UNUSED)<br>BITS 3-0=0xF (UNUSED) |

CAN HEADER FOR SOFTWARE COMPONENT REGISTRATION MESSAGE    *FIG. 2B*

| BYTE NUMBER (8 BITS) | DESCRIPTION | VALUE |
|---|---|---|
| 1 | DEVICE TYPE REGISTERING FOR | DEVICE TYPE |
| 2 | DEVICE CAPACITY | NUMBER OF DEVICES IN DATA BYTE 2 WHICH COMPONENT CAN CONTROL |
| 3-6 | CHANNEL HANDLE (32 BITS) | CHANNEL HANDLE TO WHICH DEVICE MESSAGES ARE PUBLISHED TO |

DATA FOR SOFTWARE COMPONENT REGISTRATION MESSAGE    *FIG. 2C*

| VALUE | MESSAGE TYPE |
|---|---|
| 0x1 | ALARM |
| 0x2 | COMMAND |
| 0x3 | ACKNOWLEDGE |
| 0x4 | STATISTIC |
| 0x5 | DOWNLOAD |
| 0x6 | MMI |
| 0x7 | REGISTRATION |

*FIG. 3*

| FRAME ID<br>BITS 15, 14 | MESSAGE OPCODE<br>BITS 13-8 | DEVICE TYPE<br>BITS 7-4 | DEVICE NUMBER<br>BITS 3-0 |
|---|---|---|---|

*FIG. 4A*

| BYTE NUMBER (8-BITS) | DESCRIPTION | VALUE |
|---|---|---|
| 1 | FRAME ID, MESSAGE OPCODE | BITS 7,6=FRAME ID<br>BITS 5-0=MSG. OPCODE |
| 2 | DEVICE TYPE, DEVICE NUMBER | BITS 7-4=DEVICE TYPE<br>BITS 3-0=DEVICE NUMBER |

CAN HEADER      *FIG. 4B*

| MESSAGE TYPE<br>BITS 10-7 | DEVICE TYPE<br>BITS 6-3 | RESERVED<br>BITS 2-0 |
|---|---|---|

*FIG. 5*

| FRAME ID | DESCRIPTION |
|---|---|
| 0x2 | START FRAME |
| 0x0 | MID FRAME |
| 0x3 | END FRAME |

*FIG. 6* ns output from the transceiver and switching sets used to
assure proper routing of RF signals from the antenna, through
software applications commonly referred to as controlling
software components. The controlling software components
typically control the peripheral devices by broadcasting control messages to multiple peripheral devices over a multi-drop
bus, or by discretely communicating with a single peripheral
device using a hardware addressing messaging scheme over a
point-to-point bus.

The above-mentioned bus configurations, however, have
certain associated limitations. A multi-drop bus such as a
CAN bus provides a low cost integrated solution for networking controlling software applications or components with
peripheral devices. However, a multi-drop CAN bus, while it
enables a controlling software component to communicate
with several peripheral devices via a broadcast messaging
scheme, does not enable the software component to communicate with only a specific one or ones of the peripheral
devices via a hardware address messaging scheme. In addition, the controlling software component must be reconfigured each time a peripheral device is removed or added to the
bus, thereby increasing base station down time and maintenance costs.

On the other hand, a controlling software component that is
tied to a peripheral device via a dedicated point-to-point bus
can discretely address the peripheral device using hardware
addressing messaging. However, dedicated point-to-point
connections require a high degree of input/output processing
and additional discrete control lines or connections at, for
example, the base station backplane, and are therefore
impractical to implement on a system wide basis due to cost
and space considerations.

What is needed then is a system and methodology that
enables controlling software components to discretely communicate with processor-controlled peripheral devices over
one or more multi-drop busses.

BRIEF DESCRIPTION OF THE DRAWINGS

Objects and advantages of the present invention will be
more readily apparent from the following detailed description
of preferred embodiments thereof when taken together with
the accompanying drawings in which:

FIGS. 2A-2C are message data tables showing the contents
of messages transmitted by a controlling software component
shown in FIG. 1;

FIG. 3 is a table of message types when a controlling
software component is a message source;

FIGS. 4A and 4B are tables illustrating the make-up of a
CAN header component according to the CAN bus messaging of the present invention;

FIG. 5 is a table illustrating the make-up of a CAN protocol
hardware message filter/identifier created by both a peripheral device and a software switch when a controlling software
component is a message source;

FIG. 6 is a table of possible frame ID values to signify a
frame length of a message transmitted by a controlling software application;

DETAILED DESCRIPTION OF THE PREFERRED EMBODIMENTS

Figure 1:
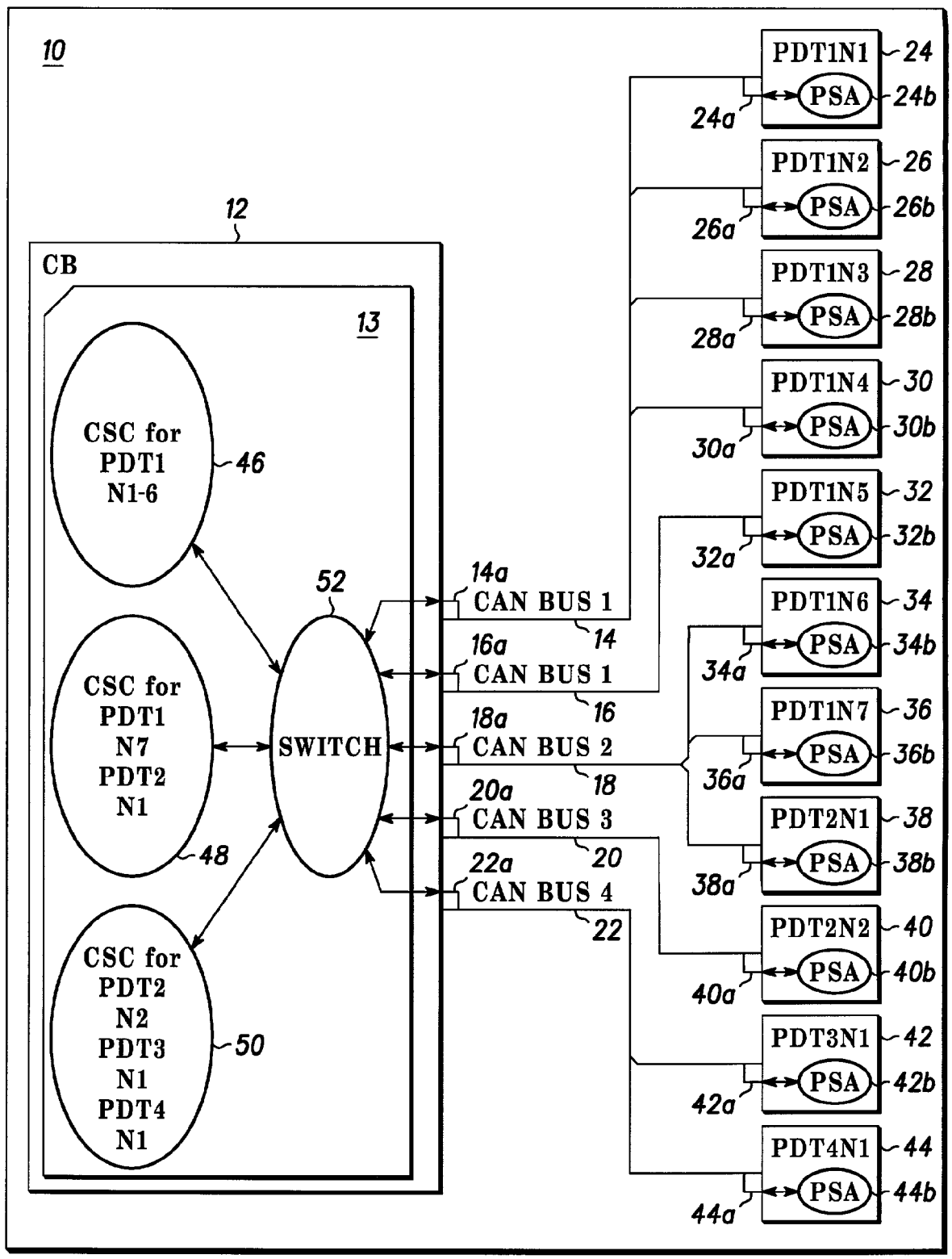
FIG. 1 is a hardware/software block diagram of a wireless
base station in which a preferred embodiment of the CAN bus
system and messaging according to the present invention may
be implemented.

Referring now to the drawings in which like numerals
reference like parts, FIG. 1 shows a diagram of an exemplary
wireless base station 10 in which a preferred embodiment of
the dynamic CAN bus system configuration and messaging
may be implemented. The base station 10 has a hardware
platform that is capable of supporting numerous air interface
technologies such as, for example, UMTS, EDGE, iDEN and
1XTREME technologies. However, it is contemplated that
the base station 10 may be configured to support other types
of air interface technology that may be required by various
wireless applications.

The base station 10 includes inter alia a controller area
network (CAN) controlling board 12 including a controller
13 and several CAN bus processors 14a-22a for respectively
controlling CAN busses 14-22. Each of the CAN busses
14-22 connects the controlling board 12 to one or more processor-controlled peripheral devices 24-44, such as, for
example, amplifier sets to amplify RF signals output from the
transceiver, switching sets used to assure proper routing of RF
signals from the antenna, custom power supplies, custom fan
trays, RF filtering devices, RF combiners and the like, each of
which includes one of the respective peripheral device processors 24a-44a, preferably through hardware connections
established through a base station backplane (not shown).
Specifically, the bus connections are as follows: the multi-drop bus 14 connects the controlling board 12 to the processor-controlled peripheral devices 24-30; the point-to-point
bus 16 connects the controlling board 12 to the processor-controlled peripheral device 32; the multi-drop bus 18 connects the controlling board 12 to the processor-controlled
peripheral devices 34-38; the point-to-point bus 20 connects
the controlling board 12 to the processor-controlled peripheral device 40; and the multi-drop bus 22 connects the controlling board 12 to the processor-controlled peripheral
devices 42-44.

It should be appreciated that the above connections are
exempla in nature, as the exemplary processor-controlled
peripheral devices 24-44 may be connected to the controlling
board via numerous variations in the above-discussed multi-drop or point-to-point busses. In addition, more, or fewer,
processor-controlled peripheral devices may be connected to
the controlling board 12 using more, or fewer, busses depending upon the particular base station application.

Still referring to FIG. 1, operation of the controlling board
12 with respect to its control of the processor-controlled peripheral devices 24-44 will now be discussed in more detail. The controlling board 12 is preferably a software controlled hardware entity that performs various function(s) within an electronic system in the base station 10, and that includes the controller 13 and the bus processors 14a-22a. The controller 13 is programmed wit h controlling software components (CSCs), such as exemplary controlling software components 46-50, and with a software switch 52 for enabling the controlling software components 46-50 to control the processor-controlled peripheral devices 24-44 by controlling peripheral software applications 24b-44b programmed into each of the respective peripheral device processors 24a-44a. Specifically, the controlling software component 46 is shown as controlling processor-controlled peripheral devices of device type 1 (T1) and of device numbers 1-6 (N1-6). In FIG. 1, the corresponding processor-controlled peripheral devices are processor-controlled peripheral devices 24-34. The controlling software component 48 is shown as controlling processor-controlled peripheral devices of device type 1 (T1) and of de vice number 7 (N7), as well as processor-controlled peripheral devices of device type 2 (T2) and of device number 1 (N1). In FIG. 1, the corresponding processor-controlled peripheral devices are processor-controlled peripheral devices 36 and 38. The controlling software component 50 is shown as controlling processor-controlled peripheral devices of device type 2 (T2) and of device number 2 (N2) as well as processor-controlled peripheral devices of device types 3 and 4 (T3, T4) and of device number 1 (N1, N1). In FIG. 1, the corresponding processor-controlled peripheral devices are processor-controlled peripheral devices 40-44.

The controlling software components 46-50 are able to discretely control the peripheral software applications 24b-44b over the CAN busses 14-22 through a messaging scheme based on both a CAN bus protocol implemented at the CAN bus processors 14a-22a and a hardware device protocol stacked on top of the CAN bus protocol and implemented at the peripheral device processors 24a-44a and the switch 52. The hardware device protocol is designed to abstract the controlling software components 46-50 from the details of the CAN bus protocol and at the same time contain the necessary information to enable the controlling software components 46-50 to communicate with the processor-controlled peripheral devices 24-44 via the CAN busses 14-22. Therefore, a CAN bus that is equipped with a single peripheral device (point-to-point connection), such as the CAN bus 16, is treated identically to a multi-drop CAN bus, such as the CAN bus 14. The controlling software components 46-50 are unaware of the network topology of the processor-controlled peripheral devices 24-44; each of the controlling software components 46-50 simply has a messaging interface to the processor-controlled peripheral devices 24-44 that it is controlling as if it were a co-located task within a register/subscriber messaging scheme.

In more detail, before messages or control messages can be routed between the switch 52 and the, respective, controlling software components 46-50, these software components must register with the switch. Similarly the processor controlled peripheral devices 24-46 must also register with the switch 52 using the CAN busses and messages as formatted and discussed below. After the controlling software components and peripheral devices have registered thus establishing a connection they can exchange messages as further detailed below. For example one message exchange is a heartbeat message that is periodically sent from the controlling software component to each peripheral device that it is connected to via the switch. The heartbeat message is a COMMAND type of message with a HEARTBEAT message Op-code that in one embodiment is sent once every 3 seconds. The peripheral devices, each send a similar heartbeat message to there, respective controlling software component via the switch. In this fashion registration of a peripheral device or the connection with the device is maintained. In one embodiment if either the peripheral device or controlling software component fails to receive 5 consecutive heartbeats from the other it is assumed that something is amiss and registration is re-initiated thus establishing new connections. This will become clearer with the discussions below.

The controlling software components accomplish or initiate registration using a registration message, such as the exemplary registration message shown and defined in FIGS. 2A-2C. As depicted the registration message from the controlling software component is 10, 16 bit words with: word 1 being a Functional Area ID further discussed below that is a unique identifier for a particular controlling software component; word 2 indicating a message type that is set to 0x7 indicating a REGISTRATION type; word 3 and 4 are a 32 bit transaction ID that is set to 0 and not further relevant nor discussed; Word 5 and Word 6 are, respectively, an upper and lower word for message length where the upper or Word 5 is set to 0 and the lower is irrelevant for a registration message; word 7 is a CAN header shown in FIG. 2B; and Words 8-10 are data words shown in FIG. 4C. The CAN header is a 2 byte, 16 bit word, with the first 2 bits defining a Frame Id, set to 0, the next 6 bits defining a Message Opcode, set to 0x7, the next 4 bits defining a device type, set to 0xf and the last 4 bits defining a device number, also set to 0xF where these setting are specific to a registration message. The three data words 8-10 represent 6 bytes where the first byte indicates the device type the software component is registering to support, the second byte indicates the number of devices or capacity the software component can control, and the last 4 bytes are a channel handle or Id for the controlling software component. This Id or handle allows multiple peripheral devices or specifically messages there from to be routed by the switch to a single controlling software component.

After registration, each of the control messages routed to and from or between the switch 52 and the controlling software components 46-50 includes a messaging or message header, in part of the same form as the registration message, that includes both Common and CAN header components. This header is followed by message data. Thus, all messaging involving a controlling software component has a similar header. An exemplary form or format of the message header is as follows.

Common Header Component:
16 bit Word 1: Functional Area ID
16 bit Word 2: Message Type
16 bit Word 3: Message Length Upper Word
16 bit Word 4: Message Length Lower Word
16 bit Word 5: Can header
where the CAN header includes: Frame ID, Message Opcode, Device Type, and Peripheral Device Number. Note an alternative form includes two additional 16 bit words specifying a transaction Id that are inserted between words 2 and 3. Since these are not used in the preferred embodiment they will not be discussed.

In the common header component, the Functional Area ID is a unique 16-bit identifier for the controlling software components 46-50. The Functional Area ID is the identifier that specifies the identity of the controlling software component plus the logical instance number of the controlling software component, and must be unique for each of the controlling software components 46-50. The logical instance numbers are used when there are multiple instances of the same controlling software component controlling like or unlike processor-controlled peripheral devices. The combination of the identity and the logical instance number or Functional Area ID provides a unique identifier to the system for the controlling software component. Each of the controlling software components 46-50 fills this field with its unique information when sending a control message to the switch for one or more of the processor-controlled peripheral devices 24-44. The switch 52 fills this field with the Functional Area ID of a receiving controlling software component when routing a message from one of the processor-controlled peripheral devices 24-44 to one of the controlling software applications 46-50.

The Message Type is a 16-bit identifier. If one of the controlling software components 46-50 is the source of a message, the Message Type is used by the switch 52 to create a CAN message identifier or filter. Given that the Message Type is used by the switch 52 for the CAN filter, the processor-controlled peripheral device Message Type must be less than or equal to 15 (4 bits). This is because the Message Type field, such as the exemplary Message Type field depicted in FIG. 5, only allows a 4-bit field for message type specification. Each Message Type and its corresponding hexadecimal assignment are shown in the table in FIG. 3. The reader attention is directed to the last message type, specifically 0x7 denoting registration as above discussed with reference to FIG. 2. If one of the processor-controlled peripheral devices 24-44 is the source of the message and the message is being routed to one of the controlling software components 46-50, the switch 52 packs the message type field, word 2, with the Message Type value in the upper byte and the message opcode in the lower byte using the values received from the peripheral devices in the CAN filter FIG. 5 and the CAN header FIG. 4B. In order for one of the controlling software components 46-50 to receive the message, the controlling software component must register with the switch 52 to receive messages from the specified processor-controlled peripheral device type as above discussed.

The Message Length is a 32-bit field that identifies the total length of the message being transmitted, and is used by the switch 52 to determine the total number of frames needed upon transmitting the messages to a processor-enabled peripheral device.

As indicated in the table shown in FIG. 4A, the CAN header, word 5, which includes Frame ID, Message Opcode, Device Type, and Device number, is a 16-bit packed identifier. This header component need not be explicitly known by the controlling software components 46-50. Regarding the Frame ID, bits 15 and 14, these bits are not applicable to messaging between the switch 52 and the controlling software components 46-50 and are only used within the CAN messages routed to and from the processor-controlled peripheral devices 24-44. From the perspective of the controlling software components 46-50, the Frame ID bits are reserved for the routing of messages to the switch 52 from the processor-enabled peripheral devices 24-44 and from the switch 52 to the processor-enabled peripheral devices 24-44 across CAN busses 14-22. Because the CAN header is not discretely assigned by the controlling software component, the Frame ID bits are not used by the controlling software component.

The Message Opcode bits 13-8 represents a message opcode having a range defined by the controlling software components 46-50. This field is used to direct different operations for a single Message Type. Each Message Type (Word 1) may have up to 64 unique Opcodes. These Opcodes allow applications to define, for example, different alarms for various status information or different commands, such as key, de-key and the like.

The Device Type bits 7-4 and Device Number bits 3-0 form a unique identifier for the processor-controlled peripheral devices 24-44 when each is involved in a communication with one of the controlling software components 46-50 For example a power amplifier, low power amplifier, or receiver module or device would have unique device types. If a controlling software component originates a message, the information contained in this byte is the destination identifier of the processor-controlled peripheral device. If a processor-controlled peripheral device originates a message to its controlling software component, the information contained in this byte represents the source identifier of the processor-controlled peripheral device. The processor-controlled peripheral device number must be unique to a single processor-controlled peripheral device. The device number can, for example, be the base station slot ID of the processor-controlled peripheral device. Controlling software components 46-50 to communicate with the processor-controlled peripheral devices 24-44 is abstracted from the controlling software components 46-50. In fact, a controlling software component initiating a communication with a processor-controlled peripheral device is unaware that only part of the message header is actually sent to the processor-controlled peripheral device and that the message may require multiple CAN message frames on the particular CAN bus being utilized. Likewise, each of the controlling software components 46-50 is unaware if a message it receives from a processor-controlled peripheral device requires multiple CAN message frames because it is the switch that collates the separate CAN message frames from a processor-controlled peripheral device into a single message that is then sent from the switch to the assigned controlling software component.

The CAN bus protocol requires that a single CAN message contains only eight data bytes and an additional eleven bits (as shown in FIG. 5) of message filter. As further explained below this is preferably used for: two bytes of header information in the form shown in FIG. 4A and detailed in FIG. 4B with the 2 bit Frame Id filled with a value from the table in FIG. 6 (discussed below); up to six bytes of data; and the eleven filter fits. The switch 52 abstracts these filter bits from the message header, specifically word 2 for the message type and word 5 for the device type as supplied by the controlling software components 46-50 and partitions the data as necessary for the CAN bus protocol. The eleven bits of message filter are used by the hardware filters implemented at the respective peripheral device processors 24a-44a, while two of the eight data bytes devoted to header information in the CAN message are used by the software filters implemented at the respective peripheral device software applications 24b-44b.

Specifically, the hardware filters implemented at the peripheral device processors 24a-44a enable a message to be routed from one of the controlling software components 46-50 only to those processor-controlled peripheral devices that are of the device type specified in the eleven bits of message filter. While standard CAN bus protocol utilizes all eleven bits for message type data, the present protocol instead uses the eleven bits for both message type and device type data. Once the specified processor-controlled peripheral devices receives the message as filtered through the hardware filters, each of the software filters implemented at the underlying peripheral device software applications determines if the message is specifically intended for its particular processor-controlled peripheral device. Consequently, as a result of the above message configuration and the hardware and software filters, a specific one of the controlling software components 46-50 can discretely communicate with a specific one of the processor-controlled peripheral devices 24-44 over one of the CAN busses 14-22.

When one of the controlling software components 46-50 is the source of a message, the switch 52 creates the message identifier or CAN header for messages outbound on the CAN busses, based upon information provided in the Common and CAN header components and as shown in the tables in FIGS. 4A, 4B, 5, and 6. Note, that when one of the processor-controlled peripheral devices 24-44 is the source of a message, the device should put the proper message type and device type into the message filter. The message filter and the message identifier or CAN header for the CAN message on the busses will not be visible to the controlling software component. The filters for CAN devices located on the switch 52, i.e. all of the processor-controlled peripheral devices 24-44, are enabled to receive all messages transmitted on the CAN busses 14-22, since a processor-controlled peripheral device may only send a message to a controlling software component. The processor-controlled peripheral devices 24-44 should pack the proper information into the message identifier or CAN Header as indicated in FIG. 4A and detailed in FIG. 4B using the frame Id as defined in FIG. 6.

The switch 52 is required to partition messages based upon the CAN bus protocol because it must abstract the controlling software components from the CAN bus implementation. The switch 52 receives only one message from a controlling software component (ultimately destined for a processor-controlled peripheral device), regardless of the size of the message. If the message size exceeds CAN bus limitations, the switch 52 is responsible for partitioning and sending the multiple CAN frames required to send the complete message.

As defined in the hardware device protocol, each CAN frame (or message) contains two bytes of header as shown in the table in FIGS. 4A and 4B, with the table in FIG. 4B detailing the information that the switch 52 packs in the CAN header. The switch 52 adds the Frame ID to the destination information received in the header of the message only when sending the CAN message or frames to the processor-controlled peripheral device to create the two-byte message header. The Frame ID is used to signify if a control message spans multiple CAN frames. Possible values for the Frame ID are shown in the table in FIG. 6.

Thus, a CAN message or frame contains two bytes of header data and six bytes of message data. If the message data received from a controlling software component is greater than six bytes, the switch 52 must partition the data into consecutive CAN frames. The switch sets the Frame ID based upon the number of CAN frames the control message spans. There are three possible scenarios that must be handled: one CAN frame; two CAN frames; and more than two CAN frames.

If a control message fits into one CAN frame (six bytes or less) the switch 52 fills the Frame ID with an "End Frame" value. If a control message fits into two CAN frames, the switch 52 fills the Frame ID of the first frame with a "Start Frame" value and the Frame ID of the second frame with an "End Frame" value. It is valid to receive an "End Frame" immediately after a "Start Frame." If a controlling application spans more than two CAN frames, the switch 52 fills the Frame ID of the first frame with a "Start Frame." The switch 52 fills each subsequent frame with a "Mid Frame" until the final frame is reached. The switch 52 fills the last frame with an "End Frame."

As a single CAN frame is limited to eight data bytes while the messaging requirements of the processor-controlled peripheral devices 24-44 are not be limited to eight byte messages, the Frame ID defined in the software device protocol is used by the processor-controlled peripheral devices 24-44 to assemble incoming messages from the controlling software components 46-50. Conversely, the switch 52 is required to assemble messages received from the processor-controlled peripheral devices based upon the CAN bus protocol because it must abstract the controlling software components 46-50 from the CAN bus implementation.

Specifically, the switch 52 sends only one message to a controlling software component regardless of how many CAN frames the message spans. If a message sent from a processor-controlled peripheral device spans more than one CAN frame, it is the responsibility of the switch 52 to assemble the message and route it to the intended controlling software component when the message is complete. The switch 52 uses the Frame ID in the CAN header component to assemble messages from the processor-controlled peripheral devices 24-44. As defined in the hardware device protocol, each CAN frame (or message) contains two bytes of header followed by six bytes of data.

If a device message fits into a single CAN frame (six bytes or less) the Frame ID in the CAN message header is an "End Frame" value. If a device message fits into two CAN frames, the Frame Id of the first frame is a "Start Frame" value and the Frame ID of the second frame is an "End Frame" value. It is valid to receive an "End Frame" immediately after a "Start Frame." If a device message spans more than two CAN frames, the Frame ID of the first frame is a "Start Frame" value. The Frame ID of each subsequent frame is a "Mid Frame" until the final frame is reached The Frame ID of the last frame is an "End Frame."

The switch 52 cannot receive a "Mid Frame" that is not preceded by a "Start Frame." If the switch 52 does receive a "Mid Frame" which is not preceded by a "Start Frame," it will disregard the entire message received (up to the "End Frame") from the source processor-controlled peripheral device and will subsequently generate an error message.

Also, the switch 52 cannot receive a "Start Frame" that is not preceded by an "End Frame." If the switch 52 receives a "Start Frame" which is not preceded by a "End Frame," it will disregard the entire message received (up to the "Start Frame") from the source processor-controlled peripheral device and generate an error.

By overlaying a hardware and software device protocol on a CAN bus protocol to realize CAN bus messaging as described above, the controlling software components 46-50 can discretely communicate with external processor-controlled peripheral devices such as the processor-controlled peripheral devices 24-44 using multiple multi-drop CAN busses. In addition, the above configuration facilitates communication of a controlling software component with processor-controlled peripheral devices through either a point-to-point addressing scheme or through a broadcast scheme. The combination protocol facilitates high availability and redundancy of the processor-controlled peripheral devices, as well as greater messaging flexibility than is offered by conventional CAN message-type filtering alone.

Figure 7:
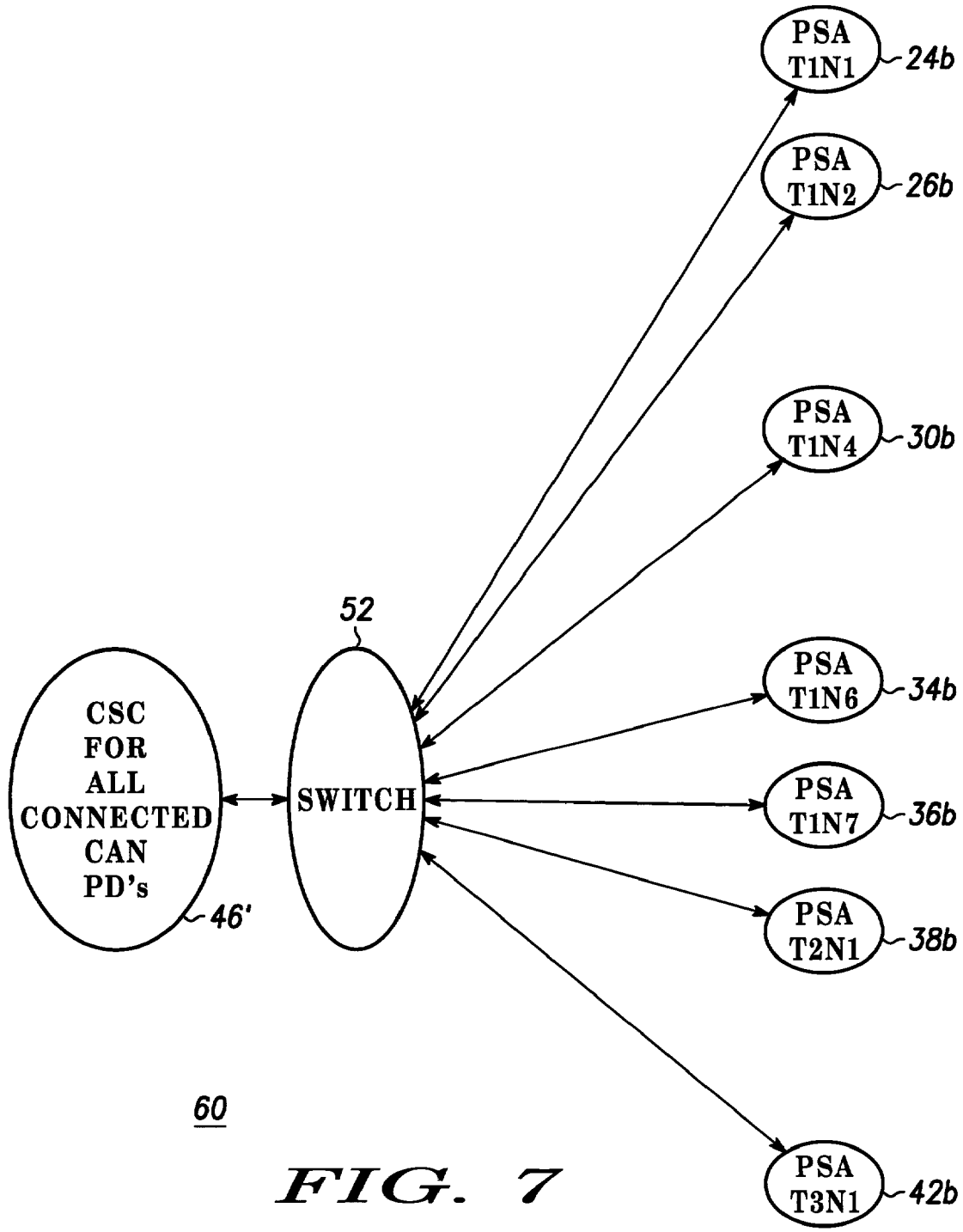
FIG. 7 is a software block diagram of a second type of
software methodology necessary to realize the CAN bus system and methodology of the present invention.

Further, the above-described CAN bus messaging can be adapted to accommodate any number of controlling software components and variations in the number of processor-controlled peripheral devices up to 16 and type of processor-controlled peripheral devices up to 16. The reason the number and type of processor controlled peripheral devices is limited to 16 is due to the type and number fields being limited to 4-bits. These fields may be extended to provide more or fewer possible combinations of processor-controlled peripheral devices For example, an alternate base station system software configuration is shown at 60 in FIG. 7. Only one controlling software component 46', and fewer processor-controlled peripheral devices than in the base station 10 in FIG. 1, are implemented in this configuration. However, the CAN bus messaging as described above is implemented in the same above-described manner Turning now to FIGS. 8-11, dynamic system configuration of external CAN processor-controlled peripheral devices such as the processor-controlled peripheral devices 24-44 shown in FIG. 1 will be discussed. This dynamic system configuration provides a high degree of system architecture flexibility and expansion capability by creating a plug-and-play type of environment for processor-controlled peripheral devices not located on the controlling board 12, such as those shown at 24-44 in FIG. 1, on multiple CAN busses, such as t hose shown at 14-22 in FIG. 1, that in turn are terminated by processors, such as the processors 14a-22a in FIG. 1. Because processor-controlled peripheral devices may be dynamically added to a communication system such as the base station 10 in FIG. 1, the number of software changes required to increase the number of existing available devices and to add new devices is minimized or eliminated. In addition, the system down time required to remove a peripheral device from the system during in-service operation is minimized or eliminated.

Although the following description will reference the wireless base station 10 and its hardware and software components, it should be appreciated that the dynamic system configuration is applicable not only to a multi-drop CAN bus environment, but also to any environment including multiple serial bus ports and requiring dynamic system configuration, or plug-and-play, capabilities.

The following dynamic system configuration design tenets are followed to provide both a complete abstraction of t he hardware implementation of CAN bus messaging to the processor-controlled peripheral devices and plug-and-play capability for the processor-controlled peripheral devices.

As previously discussed, a controlling software component may control multiple processor-controlled peripheral devices and multiple device types. However, a processor-controlled peripheral device registers, via a can message with the proper message type, etc (see above) with only a single controlling software component. Therefore, all messages from a processor-controlled peripheral device are routed to its singular address specified in the controlling software component registration message. This may be the address of the controlling software component but is not limited to the controlling software component. The address may also be a broadcast channel for receipt by multiple controlling software components. When the registration process is complete, multiple controlling software components may also send messages to a processor-controlled peripheral device if they contain the necessary information for message construction and addressing (i.e. received by broadcast).

The switch 52 is responsible for making a logical connection between a processor-controlled peripheral device and its controlling software component. The logical connection consists of the routing information used to send messages from a controlling software component to a processor-controlled peripheral device and to send messages from a processor-controlled peripheral device to a controlling software component. It is contemplated that the switch 52 is only used for processor-controlled peripheral devices located on the CAN busses 14-22. Although the switch 52 does not extend communication links to peripheral devices that have direct discrete hardware control lines, the switch 52 could be alternatively designed to extend communication on other bus types such as, for example, serial port, parallel port, Universal Serial Bus (USB), V-11 port, and 1-wire bus types.

Any of the controlling software components 46-50 may be reset without the switch 52 being reset. In addition, any of the processor-controlled peripheral devices 24-44 may to reset without the switch 52 being reset. If the switch 52 is reset, all components on the controller board 12 are reset and all logical connections are lost.

A controlling software component only registers for a device type once. The single registration includes the number of processor-controlled peripheral devices of that device type that the controlling software component can control. The controlling software component re-registers when it detects the removal of one of its processor-controlled peripheral devices from the system. The new registration takes the place of the former registration. A processor-controlled peripheral device registers periodically until a controlling software component acknowledge message is received. Registration of a processor-controlled peripheral device means that the processor-controlled peripheral device has been reset.

The switch 52 connects the processor-controlled peripheral devices 24-44 to a controlling software component on a first in/first out (FIFO) basis. All processor-controlled peripheral devices of the same device type are logically connected to the first controlling software component that registered for that type and that still has capacity. If there are multiple processor-controlled peripheral devices that are registered for the same device type, subsequent processor-controlled peripheral devices are not connected until the prior capacity is met.

Messages originating from a processor-controlled peripheral device can only be destined for a controlling software component. Processor-controlled peripheral devices that are multi-dropped on the same CAN bus cannot send messages directly among one another.

There are four possible registration scenarios that the switch 52 must handle for the controlling software components 46-50 and the processor-controlled peripheral devices 24-44. Each of the scenarios will be discussed below in detail.

Figure 8:
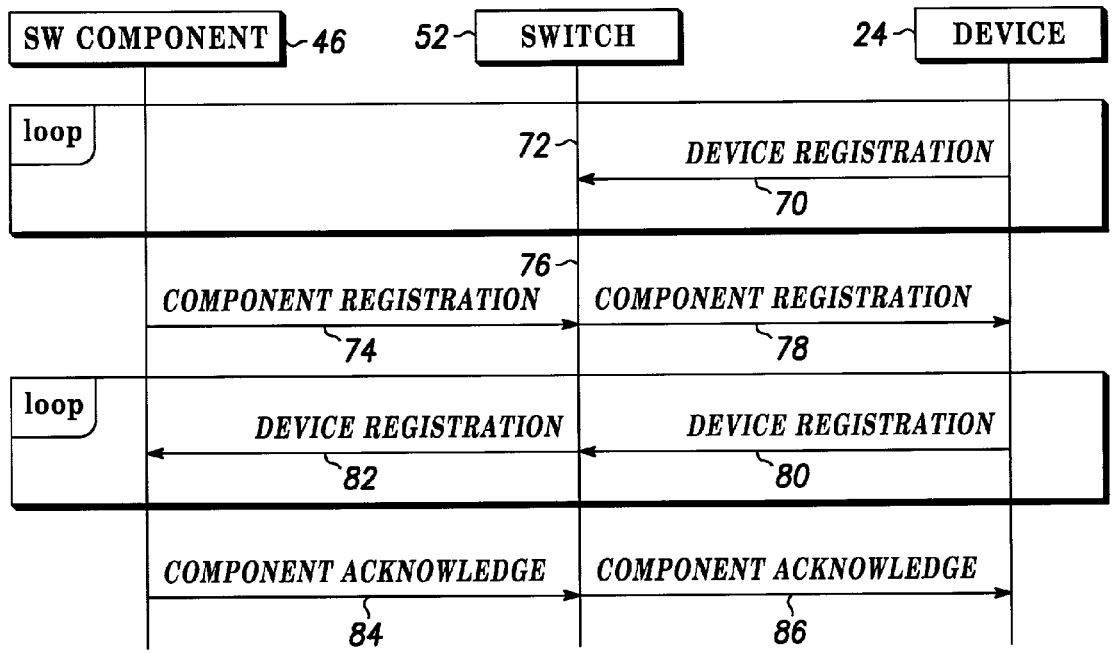
FIGS. 8-11 are timing diagrams illustrating the messaging
protocol associated with the CAN bus system and methodology of the present invention that enables various components
of the base station shown in FIG. 1 to communicate with one
another.

Referring to FIG. 8, in the first scenario, a processor-controlled peripheral device, such as, for example, the processor-controlled peripheral device 24, registers first at 70. No previously existing logical connections exist for processor-controlled peripheral devices of the type and number of the registering processor-controlled peripheral device 24, and no controlling software components have registered for the processor-controlled peripheral device type. At 72, upon receipt of the first registration of the processor-controlled peripheral device type and number, the switch 52 adds the processor-controlled peripheral device to its routing table as an available device. The switch 52 periodically receives and discards non-matching registration messages from controlling software components until at 74 a valid registration arrives from a controlling software component, such as the controlling software component 46. As a controlling software component may register for multiple processor-controlled peripheral device types, a valid registration in this case is a registration for processor-controlled peripheral device types including a device type corresponding to that of the processor-controlled peripheral device 24.

When the switch 52 receives a valid registration from the controlling software component 46, it creates at 76 a logical routing connection between the available processor-controlled peripheral device 24 and the controlling software component 46. At this point, the processor-controlled peripheral device is no longer available for connection because a single processor-controlled peripheral device may only have a single controlling software component for registration. At 78, the switch 52 then forwards the controlling software component registration to the processor-controlled peripheral device 24. At 80, the processor-controlled peripheral device 24 continues to send its registration message to the switch 52 until the switch 52 routes the registration message at 82 to the controlling software component 46 and the switch 52 subsequently receives a controlling software component acknowledge message from the controlling software component at 84 and routes it to the processor-controlled peripheral device 24 at 86.

Figure 9:
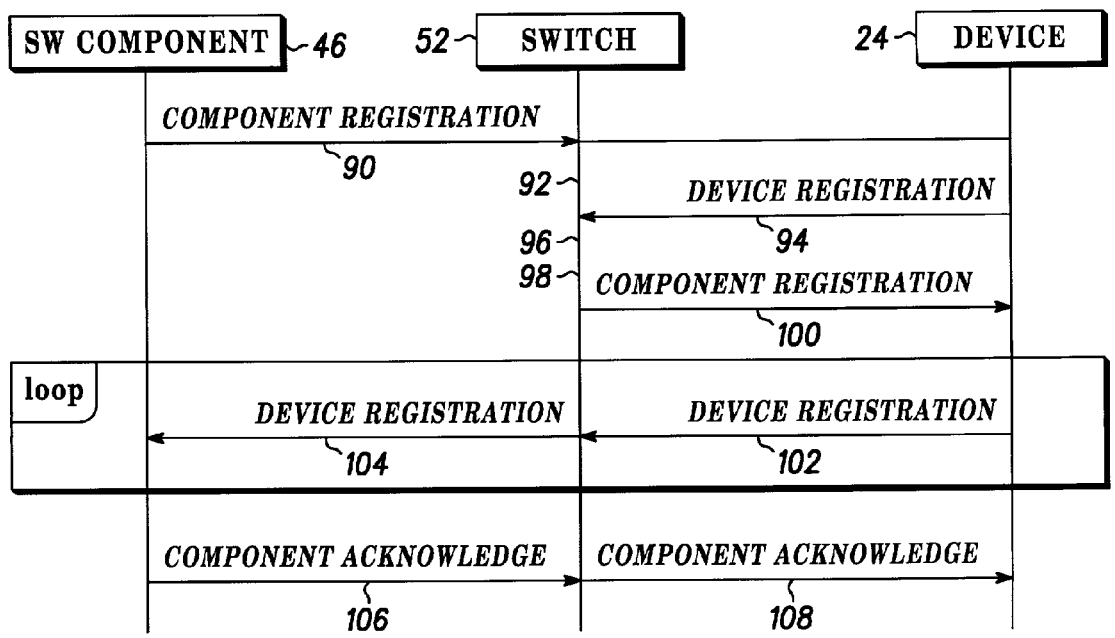

Referring to FIG. 9, in the second scenario, the controlling software component 46 registers first at 90. The controlling software component 46 creates a single registration message for a device type. At 92, upon receipt of the registration message from the controlling software component, the switch 52 adds the controlling software component 46 to its routing table as an available controller for a number of the processor-controlled peripheral devices specified in the registration and stores the registration message. It is contemplated that the controlling software component 46 may control multiple processor-controlled peripheral devices of the same type.

Upon receipt of a registration at 94 from a processor-controlled peripheral device of the specified type, such as the processor-controlled peripheral device 24, at 96 the switch 52 adds the processor-controlled peripheral device to its routing table as an available device. As a controlling software component registration is already in place, the switch 52 makes a logical connection at 98 and at 100 forwards the controlling software component registration to the now unavailable processor-controlled peripheral device 24. The processor-controlled peripheral device 24 continues to send the registration message at 102 until a controlling software component acknowledge message is received. The switch 52 forwards the next processor-controlled peripheral device registration message received at 104 to the controlling software component 46 for which the logical routing connection was created. The controlling software component 46 completes the registration process by providing an acknowledge message at 106 to the switch 52, which in turn routes the acknowledge message to the processor-controlled peripheral device at 108.

It is important to note that this second scenario differs only in the order in which the processor-controlled peripheral device 24 and controlling software component 46 register. The registration process requirements remain the same.

Figure 10:
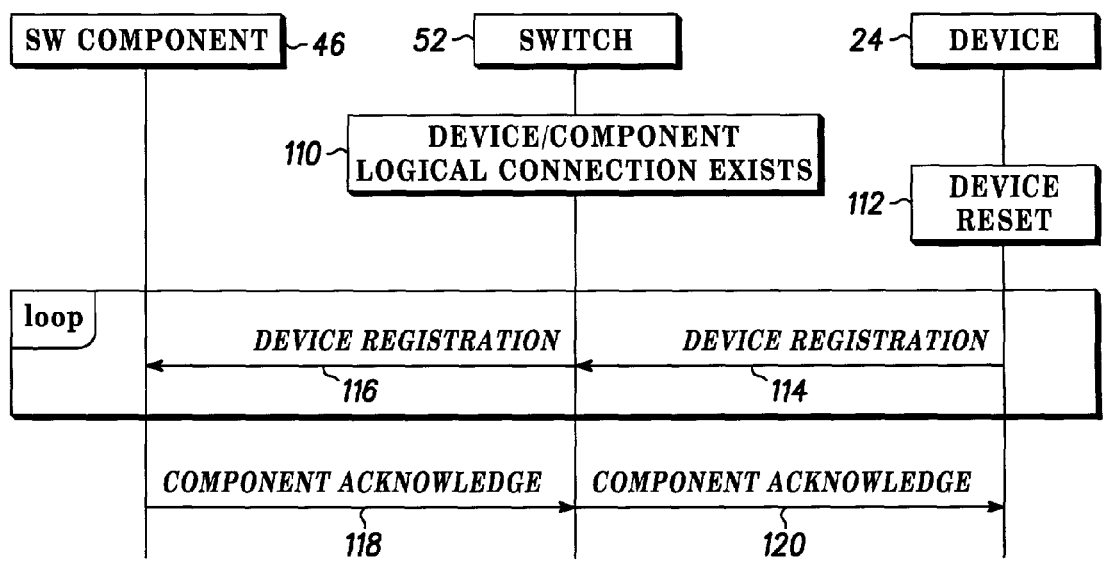
Figure 11:
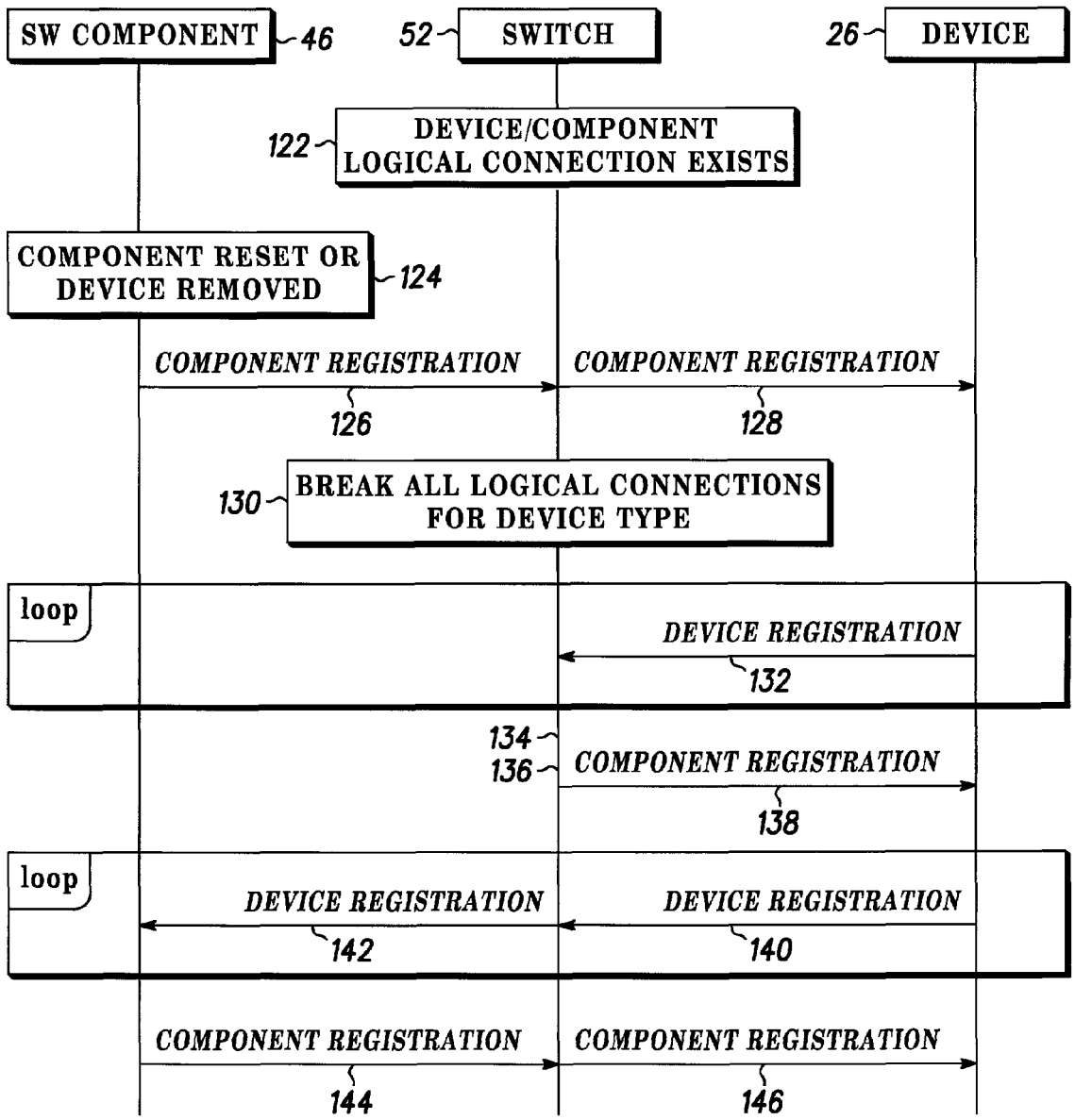

Referring to FIG. 10, in the third scenario, an existing logical connection exists at 110 when the processor-controlled peripheral device 24 registers. The existing logical connection is for the processor-controlled peripheral device type and number matching that of the registering processor-controlled peripheral device 24 indicating that the processor-controlled peripheral device 24 has been reset at 112.

At 114, the switch 52 receives a registration message, including device type and number, from the processor-controlled peripheral device 24 that already has an established logical connection. The switch 52 forwards the registration message at 116 to the appropriate controlling software component 46, as specified by the logical connection. The switch 52 handles the registration message from the processor-controlled peripheral device 24 no differently than any other received message.

The controlling software component 46 is aware that the processor-controlled peripheral device 24 has been reset regardless of whether the processor-controlled peripheral device 24 was commanded by the controlling software component 46 to reset. The controlling software component 46 completes the registration process at 118 by sending an acknowledge message to the switch 52, which in turns routes the acknowledge message at 120 to the processor-controlled peripheral device 24.

The previously existing logical connections are not changed in this scenario, thereby assuring that a processor-controlled peripheral device that resets maintains its logical connection to the same controlling software component.

Referring to FIG. 1, in the fourth scenario, an existing logical connection exists at 122 when the controlling software component 46 registers. In this scenario, there are connections for the registering controlling software component 46, indicating at 124 that the controlling software component has been reset, or that a processor-controlled peripheral device that had an established logical connection was removed and re-introduced to the system.

At 126, the controlling software component creates a registration message for each processor-controlled peripheral device type for which the controlling software component has responsibility. At 128, the switch 52 forwards the controlling software component registration to each of the processor-controlled peripheral devices of the logically-connected processor-controlled peripheral device type specified in the registration. At 130, the switch 52 then breaks all the logical connections for that processor-controlled peripheral device type and removes the processor-controlled peripheral devices from the routing table.

A processor-controlled peripheral device, such as the processor-controlled peripheral device 26, that receives the controller software component registration initiates a process to re-issue its own registration. Upon receipt of the registration from the processor-controlled peripheral device 26 of the specified type at 132, at 134 the switch 52 adds the processor-controlled peripheral device 26 to its routing table as an available processor-controlled peripheral device. Because a controlling software component registration is already in place, at 136 the switch 52 makes the logical connection and at 138 forwards the controller registration to the now unavailable processor-controlled peripheral device.

At 140, the processor-controlled peripheral device 26 continues to send the registration message until a controlling software component acknowledge message is received. At 142, the switch 52 forwards the next processor-controlled peripheral device registration message received to the controlling software component for which the logical routing connection was created. The controlling software component 46 then completes the registration process by providing an acknowledge message to the switch 52 at 144, which then routes the acknowledge message at 146 to the processor-controlled peripheral device 26.

The above-described fourth registration scenario is the most in depth registration scenario because it addresses two completely different system software concepts. The first concept relates to the resetting of a controlling software component independently of the switch 52. The second concept relates to the more complex concepts of a plug-and-play system and dynamic system processor-controlled peripheral device configuration. It is useful to further describe the system capabilities that this scenario enables.

The above-described fourth scenario enables the switch to reset the logical connections existing for an individual controlling software component that has control responsibilities for processor-controlled peripheral devices available on the CAN busses 14-24. When a controller software component is reset and re-started it is necessary to quickly connect the processor-controlled peripheral devices that were previously connected with the next available controlling software component that has registered for that processor-controlled peripheral device type to minimize system down time. The newly assigned controlling software component may or may not be the previously reset controlling software component depending upon the software configuration.

For example, a processor-controlled peripheral device will re-register when a heartbeat is lost with its controlling software component. Processor-controlled peripheral device re-registration may begin to occur before the controlling software component restarts and issues another registration. If processor-controlled peripheral device registrations are received first, conceptually the third scenario would apply until the controlling software component registers. The switch 52 may or may not forward the processor-controlled peripheral device registration message to the controlling software application, but does not alter the logical connections.

The switch 52 has facilitated the fact that a processor-controlled peripheral device is unavailable, and is not required to monitor that processor-controlled peripheral device. From the framework above the controlling software component is aware that the component, and consequently its processor-controlled peripheral devices, are unavailable (through mechanisms unimportant to the switch). The processor-controlled peripheral devices are available for control once an available controlling software component is ready. Through multiple instances of the controlling software component, on-card redundancy can be achieved.

The above-described fourth scenario also enables the dynamic configuration of the processor-controlled peripheral devices. Three plug-and-play scenarios show the plug-and-play configuration possibilities of the processor-controlled peripheral device.

In the first plug-and-play scenario, a processor-controlled peripheral device is removed from its slot and neither it nor another processor-controlled peripheral device of the same type is inserted to replace the removed processor-controlled peripheral device. This is the easiest plug-and-play scenario handled by the registration scenarios. The controlling software component recognizes when a processor-controlled peripheral device is removed from the system and re-registers for the processor-controlled peripheral devices of that type. Consequently, the fourth registration scenario is initiated. All processor-controlled peripheral devices are reconnected to the controlling software component, but the controlling software component still has capacity available should a processor-controlled peripheral device of that type be introduced to the system at a later time.

In the second plug-and-play scenario, a processor-controlled peripheral device is removed from its slot and either it or another processor-controlled peripheral device of the same type is inserted into the same slot to replace the removed processor-controlled peripheral device. This plug-and-play scenario is a continuation of the first plug-and-play scenario except that the controlling software component may not have additional capacity for that processor-controlled peripheral device type after the new processor-controlled peripheral device is introduced to the system. The controlling software component recognizes when a processor-controlled peripheral device is removed from the system and re-registers for the processor-controlled peripheral devices of that type, thereby initiating the fourth registration scenario. All previously connected processor-controlled peripheral devices are reconnected to the controlling software component, including the new processor-controlled peripheral device.

In the third plug-and-play scenario, a processor-controlled peripheral device is removed from its slot and either it or another processor-controlled peripheral device of the same type is inserted into the system in a different slot to replace the removed processor-controlled peripheral device. This is perhaps the most difficult plug-and-play scenario, but is still handled by the fourth registration scenario. It is essential that a replacement processor-controlled peripheral device be recognized and connected to a controlling software component, regardless of the slot into which it is inserted. The controlling software application recognizes when a processor-controlled peripheral device is removed from the system and re-registers for the processor-controlled peripheral devices of that type, which initiates the fourth registration scenario. The registration of the controlling software component breaks all existing logical connections. All processor-controlled peripheral devices are subsequently reconnected to the controlling software component, including the replacement processor-controlled peripheral device, which was placed in a different slot.

This is an important scenario to incorporate into the switch design, because it allows processor-controlled peripheral devices to be replaced without resetting the controlling board 12 regardless of whether the processor-controlled peripheral device was defective or whether the backplane slot was defective.

As a result of the above-described registration and plug-and-play capabilities of the switch 52, dynamic reconfiguration of processor-controlled peripheral devices is achievable.

While the above description is of the preferred embodiment of the present invention, it should be appreciated that the invention may be modified, altered, or varied without deviating from the scope and fair meaning of the following claims.

For example, the CAN identifier in FIG. 4A may use a processor-controlled peripheral device # instead of a Message Type to determine through hardware the destination of a CAN message. Also, the Opcode may be omitted from the CAN header because it is already included as part of the CAN protocol and may be used by hardware to determine a message entry point rather than using software determination through a single entry point. The Device Type and Device # fields in the CAN header may also be expanded/reduced to facilitate more/fewer devices in the system. Frame ID number assignments may then be changed to add another frame type as well as reconfigured to change the number assignment of start frame, stop frame, and mid-frame. A mid-frame without a start frame or a start frame with no subsequent frames may be used to indicate a single frame message.

Further, it should be appreciated that the software switch could logically connect a processor-controlled peripheral device to a controlling software component based on a priority assignment attached to the particular processor-controlled peripheral device or a priority assignment of the controlling software component that is either predetermined or indicated during the switch registration process.

Further, the switch registration message from the controlling software component could include a list of device types and the number of processor-controlled peripheral devices per device type for which the controlling software component has capacity, instead of requiring a registration message per device type. The switch could also maintain an existing connection with a processor-controlled peripheral device during re-registration of a software component and only break the connection of a device specified in the re-registration message.

It is also contemplated that the processor-controlled peripheral device need not fill out the Device Type and Message Type in the CAN identifier field.

Also, a transaction ID may be used in the Common header component to track request messages and responses.

It is also contemplated that multiple controlling software components may control or be logically connected to a processor-controlled peripheral device, and that the controlling software components, or the switch, may create a logical connection based upon a processor-controlled peripheral device name instead of device type/capacity methodology.

Finally, it should be appreciated that the above-discussed CAN/hardware layered protocol is independent of the software configuration of the controlling board.

What is claimed is:

1. A method of communicating over a controller area network (CAN) bus, comprising:
   routing registration information from a plurality of processor-enabled peripheral devices to a controlling software component;
   routing a periodic heartbeat message from the controlling software component to the plurality of processor-enabled peripheral devices to enable each of the plurality of processor-enabled peripheral devices to maintain its registered status; and
   if necessary, routing messages from the controlling software component to one or more of the plurality of processor-enabled peripheral devices on a discrete basis over the CAN bus to control the one or more of the plurality of processor-enabled peripheral devices.

2. The method of claim 1, further comprising causing the controlling software component to consecutively receive frames of a multi-frame message transmitted from one of the plurality of processor-enabled peripheral devices.

3. The method of claim 1, wherein the routing of messages from the controlling software component to one or more of the plurality of processor-enabled peripheral devices on a discrete basis to control the one or more of the plurality of processor-enabled peripheral devices comprises routing messages each having a like header to the one or more of the plurality of processor-enabled peripheral devices on a discrete basis to control the one or more of the plurality of processor-enabled peripheral devices.

4. The method of claim 3, wherein the routing of messages each having a like header to one or more of the plurality of processor-enabled peripheral devices on a discrete basis to control the one or more of the plurality of processor-enabled peripheral devices comprises routing messages each having a common header component and a CAN header component to the one or more of the plurality of processor-enabled peripheral-devices on a discrete basis to control the one or more of the plurality of processor-enabled peripheral devices.

5. The method of claim 4, wherein the routing of messages each having a common header component and a CAN header component to the one or more of the plurality of processor-enabled peripheral devices on a discrete basis to control the one or more of the plurality of processor-enabled peripheral devices further comprises routing messages each having a common header component and a CAN header component without specific knowledge by the controlling software component of the CAN header component.

6. A method of communicating over a controller area network (CAN) bus, comprising:
   routing a registration message from a processor-enabled peripheral device to a controlling software component;
   at the processor-enabled peripheral device, periodically receiving a heartbeat message from the controlling software component subsequent to the routing of a registration message from a processor-enabled peripheral device to a controlling software component; and
   receiving at the processor-enabled peripheral device discrete control messages that are transmitted from the controlling software component.

7. The method of claim 6, wherein the receiving at the processor-enabled peripheral device discrete control messages that are transmitted from the controlling software component comprises filtering the transmitted control messages at the processor-enabled peripheral device to enable only the discrete control messages intended specifically for the processor-enabled peripheral device to reach the processor-enabled peripheral device.

8. The method of claim 7, wherein the filtering of the transmitted control messages at the processor-enabled peripheral device to enable only the discrete control messages intended specifically for the processor-enabled peripheral device to reach the processor-enabled peripheral device comprises filtering the transmitted control messages at the processor-enabled peripheral device via a hardware filter to determine whether the transmitted control messages are for a certain type of processor-controlled peripheral device, and filtering the transmitted control messages at the processor-enabled peripheral device via a software filter to determine processor-controlled peripheral device numbers from respective message CAN headers.

9. The method of claim 8, further comprising receiving at the processor-enabled peripheral device all message frames following the processor-enabled peripheral device type and number information subsequent to the filtering of processor-enabled peripheral device type and number information from the discrete control messages intended specifically for the processor-enabled peripheral device.

10. The method of claim 7, wherein the filtering the transmitted control messages at the processor-enabled peripheral device to enable only the discrete control messages intended specifically for the processor-enabled peripheral device to reach the processor-enabled peripheral device is invisible with respect to the controlling software component.

11. The method of claim 6, further comprising, at the processor-enabled peripheral device, consecutively receiving frames of a multi-frame discrete control message.

12. A controller area network (CAN) bus for enabling a controlling software component to communicate discretely with each of a plurality of processor-enabled peripheral devices irrespective of whether the processor-enabled peripheral devices are like devices, comprising:
   a processor for routing control messages between the controlling software component and the plurality of processor-enabled peripheral devices;
   a plurality of bus lines for connecting the processor to the controlling software component and the plurality of processor-enabled peripheral devices; and
   the processor for enabling the control messages to be discretely transmitted from the controlling software component to one or more of the plurality of processor-enabled peripheral devices.

13. The CAN bus of claim 12, wherein the processor is programmed with a software switch for enabling the controlling software component to consecutively receive frames of a multi-frame message transmitted from one of the plurality of processor-enabled peripheral devices.

14. The CAN bus of claim 12, wherein the processor is programmed for enabling transmission of multi-frame CAN bus messages.

15. The CAN bus of claim 12, wherein the processor is further for generating a CAN header component for each of the control messages transmitted from the controlling software component to enable the control messages to be discretely transmitted from the controlling software component to one or more of the plurality of processor-enabled peripheral devices.

16. The CAN bus of claim 12, wherein the processor is further for causing frames of a multi-frame message transmitted to one of the plurality of processor-enabled peripheral devices from the controlling software component to be consecutively received at the one of the plurality of processor-enabled peripheral devices.

17. The CAN bus of claim 12, wherein the processor and the plurality of bus lines are implemented on a controlling board of a wireless base station.

* * * * *